US 7,349,416 B2

(12) United States Patent
Jacobs et al.

(10) Patent No.: US 7,349,416 B2
(45) Date of Patent: Mar. 25, 2008

(54) APPARATUS AND METHOD FOR DISTRIBUTING BUFFER STATUS INFORMATION IN A SWITCHING FABRIC

(75) Inventors: Mick R. Jacobs, Auburn, CA (US); Matthew Todd Lawson, Auburn, CA (US); Michael A. Benning, Roseville, CA (US)

(73) Assignee: Cisco Technology, Inc., San Jose, CA (US)

( * ) Notice: Subject to any disclaimer, the term of this patent is extended or adjusted under 35 U.S.C. 154(b) by 1071 days.

(21) Appl. No.: 10/304,412

(22) Filed: Nov. 26, 2002

(65) Prior Publication Data

US 2004/0100980 A1 May 27, 2004

(51) Int. Cl.
*H04L 12/56* (2006.01)
(52) U.S. Cl. ...................................... 370/412
(58) Field of Classification Search ................ 370/412, 370/413, 360, 359, 414, 417, 418, 380, 381
See application file for complete search history.

(56) References Cited

U.S. PATENT DOCUMENTS

| | | | | |
|---|---|---|---|---|
| 5,412,648 | A * | 5/1995 | Fan | 370/414 |
| 5,493,566 | A | 2/1996 | Ljungberg et al. | 370/60 |
| 6,205,145 | B1 * | 3/2001 | Yamazaki | 370/395.65 |
| 6,212,194 | B1 * | 4/2001 | Hsieh | 370/414 |
| 6,636,483 | B1 * | 10/2003 | Pannell | 370/236 |
| 6,914,883 | B2 * | 7/2005 | Dharanikota | 370/230.1 |
| 6,999,415 | B2 * | 2/2006 | Luijten et al. | 370/230 |
| 7,085,229 | B1 * | 8/2006 | Potter et al. | 370/231 |
| 7,145,904 | B2 * | 12/2006 | Zhao et al. | 370/371 |
| 7,203,171 | B1 * | 4/2007 | Wright | 370/236.1 |
| 7,230,917 | B1 * | 6/2007 | Fedorkow et al. | 370/229 |
| 2001/0021174 | A1 | 9/2001 | Luijten et al. | 370/229 |
| 2001/0050916 | A1 * | 12/2001 | Krishna et al. | 370/419 |
| 2002/0080780 | A1 | 6/2002 | McCormick et al. | 370/355 |

FOREIGN PATENT DOCUMENTS

EP 0603916 A2 12/1993

OTHER PUBLICATIONS

Annex to Form PCT/ISA/206 (*Communicating Relating to the Results of the Partial International Search*) as mailed from the PCT on Jul. 30, 2004, for International Application No. PCT/US03/35124, 1 page.

* cited by examiner

*Primary Examiner*—Min Jung
(74) *Attorney, Agent, or Firm*—Campbell Stephenson LLP

(57) ABSTRACT

Network switching and/or routing devices can use switching fabrics that gather information about output port buffer status and distribute that information to various line cards for use in data frame congestion avoidance. The switching fabric can gather output buffer status information for all output ports and distribute that information to each line card in an efficient, in-band manner. Individual line cards can use the information to determine from which line card virtual output queue to dequeue data frames destined for the switching fabric. Line cards can also gather output buffer status information associated with line card queues used for receiving data from the switching fabric. Such data is used in a manner similar to the output buffer data from the switching fabric.

40 Claims, 4 Drawing Sheets

APPARATUS AND METHOD FOR DISTRIBUTING BUFFER STATUS INFORMATION IN A SWITCHING FABRIC

FIELD OF THE INVENTION

The present invention relates to communications devices, and particularly to data frame transfer over switching fabrics.

BACKGROUND OF THE INVENTION

In a communications network, switching devices ("switches") receive data at one of a set of input interfaces and forward the data on to one or more of a set of output interfaces. Users typically require that such switching devices operate as quickly as possible in order to maintain a high data rate. Switches are typically data link layer devices that enable multiple physical network (e.g., local area network (LAN) or wide area network (WAN)) segments to be interconnected into a single larger network. Switches forward and flood data traffic based on, for example, MAC addresses. In the most general sense, these types of networks transport data in the form of frames. A frame is a logical grouping of information sent as a data link layer unit over a transmission medium. Frames typically include header and/or trailer information used, for example, for routing, synchronization, and error control. The header and/or trailer information surrounds user data contained in the unit. The terms cell, datagram, message, packet and segment are also used to describe logical information groupings at various layers of the OSI reference model and in various technology circles. As used herein, the term "frame" should be understood in its broadest sense, and can encompass other terms such as cell, datagram, message, packet and segment.

FIG. 1 illustrates a simplified block diagram of a switching network 100, such as a LAN switching network. In this example, the switch includes switching fabric 110 and multiple line cards 120 and 130. The switch thus connects various network devices 122, 124, 132, and 134 to each other through switching fabric 110 via line cards 120 and 130. Network devices 122, 124, 132, and 134 can, in general, include a variety of different devices including computer systems, output devices, storage devices, communications devices, or other network components such as routers, other switches, and even other networks.

It will be noted that the variable identifier "N" is used in FIG. 1 (and in other parts of this application) to more simply designate the final element (e.g., line card N 130) of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Switching network 100 can employ one or more of a variety of different communication protocols enabling data communication between network devices. Line cards 120 and 130 generally take the form of an I/O interface card that typically performs data frame analysis as part of the switching process. Switching fabric 110 can also be implemented in a variety of ways. Three common types of switching fabrics are single-bus architectures, shared-memory architectures, and crossbars. Single-bus switching fabric architectures use a central fabric element within the switch to which all the ports of the switch communicate. Each port arbitrates for access to this fabric because there is one central switching element. With shared-memory architectures, a shared memory stores data frames and a high-speed ASIC reads and writes to the memory. Frames come into the architecture, a switching core places them in memory and then queues them to their outbound port. Buffering is internal to the switching fabric in this architecture, and buffers may be either fixed or dynamic. Crossbars use a mesh within the switching fabric to connect all the ports or all the line cards at high speed. Crossbars can be highly efficient for "balanced traffic," e.g., if port 1 and port 2 are communicating, and port 3 and port 4 are communicating then the crossbar directs those transmissions onto different paths.

One of the key benefits of crossbars is the ability to scale to significantly high bandwidth and throughputs. Consequently, crossbars are a popular type of switching fabric. FIG. 2 illustrates several features of prior art crossbar-based switching schemes. In support of the crossbar 200, switching fabric 110 includes one or more input buffers 210 and one or more output buffers 220. In a typical implementation there are input and output buffers for each port in the switching fabric. Consequently, input and output buffers can be associated with particular line cards by virtue of the buffers' association with a particular port. In this example, data frames to be transferred from line card 1 120 to line card N 130 are first queued in queue 240 of line card 120. Queue 240 can be implemented as a first in first out (FIFO) buffer using a variety of memory structures as is well known in the art. Once a data frame is ready for transmission, it is serialized and transmitted across a serial channel where it is received by input buffer 210 of switching fabric 110. The data frame is transmitted across crossbar 200 to the output buffer corresponding to the appropriate port of exit, in this case output buffer 220. From output buffer 220, the data frame is serialized and transmitted to the line card corresponding to output buffer 220 port, in this case line card N 130. The data is typically received in a queue such as queue 250.

Since output buffer 220 can in general receive data from any input port attached to switching fabric 110, i.e., not just the port associated with input buffer 210 and line card 1 120, congestion problems can occur. Accordingly, it is desirable to have a switching fabric architecture that reduces the likelihood of congestion at its output buffers and accomplishes this goal with minimal impact on the switching fabric's bandwidth, throughput, and complexity.

SUMMARY OF THE INVENTION

It has been discovered that network switching and/or routing devices can use switching fabrics that gather information about output port buffer status and distribute that information to various line cards for use in data frame congestion avoidance. The switching fabric can gather output buffer status information for all output ports and distribute that information to each line card in an efficient, in-band manner. Individual line cards can use the information to determine from which line card virtual output queue to dequeue data frames destined for the switching fabric. Line cards can also gather output buffer status information associated with line card queues used for receiving data from the switching fabric. Such data is used in a manner similar to the output buffer data from the switching fabric.

Accordingly, one aspect of the present invention provides an apparatus including a plurality of input ports, a switch coupled to the plurality of input ports, and a plurality of output ports coupled to the switch. At least one of the plurality of output ports is operable to receive data via the switch from at least one of the plurality of input ports. The at least one of the plurality of output ports includes an output buffer and output buffer status logic operable to produce output buffer status information corresponding to the output buffer.

Another aspect of the present invention provides a method. Data is received at an output port of a switching fabric. The data is stored in at least one output buffer. Output buffer status information is determined based on the data stored in the output buffer. The output buffer status information is transmitted to at least one of another output port and a line card.

Yet another aspect of the present invention provides an apparatus including at least one I/O port, a data frame forwarding engine, a queue manager, a buffer, and output buffer status logic. The at least one I/O port is operable to connect to a network device. The data frame forwarding engine is coupled to the at least one I/O port. The queue manager is coupled to the data frame forwarding engine and is operable to establish and manage a plurality of virtual output queues. The buffer is coupled to the data frame forwarding engine and is operable to receive data frames from a switching fabric. The output buffer status logic is coupled to the buffer and is operable to produce output buffer status information corresponding to contents of the output buffer.

Still another aspect of the present invention provides an apparatus including a plurality of means for receiving data from at least one line card; a switching means for transferring data from the plurality of means for receiving data from at least one line card, the switching means being coupled to the plurality of means for receiving data from at least one line card; a plurality of means for receiving and storing data from the switching means, the plurality of means for receiving and storing data from the switching means being coupled to the switching means; and at least one means for determining status information corresponding to contents of at least one of the plurality of means for receiving and storing data from the switching means, the at least one means for determining status information being coupled to the at least one of the plurality of means for receiving and storing data from the switching means.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
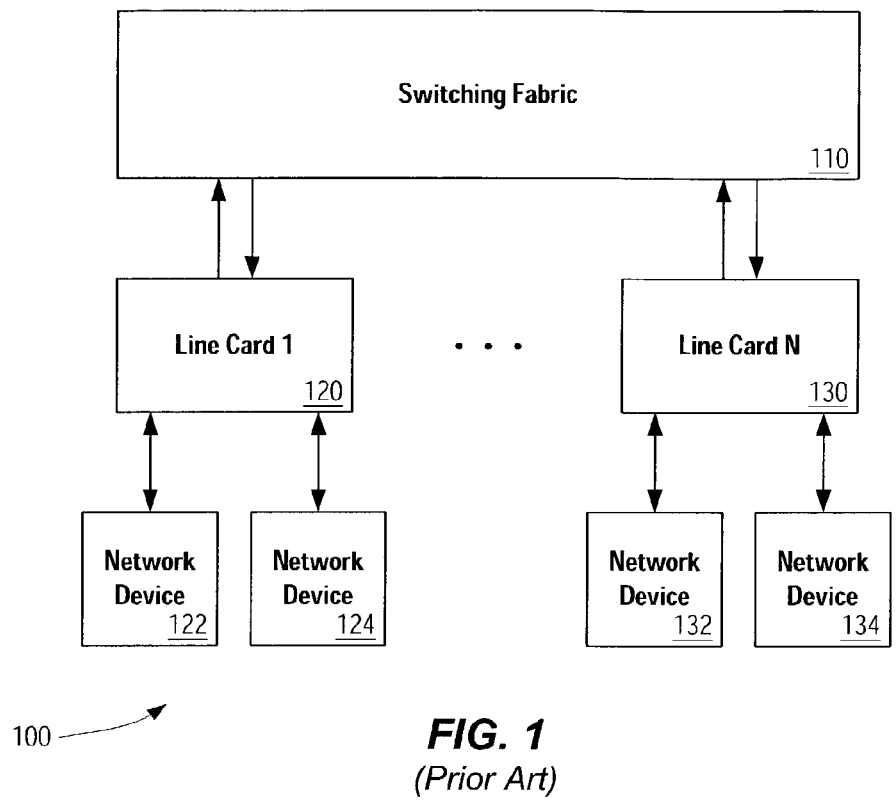
FIG. 1 is a simplified block diagram of a switching network.
Figure 2:
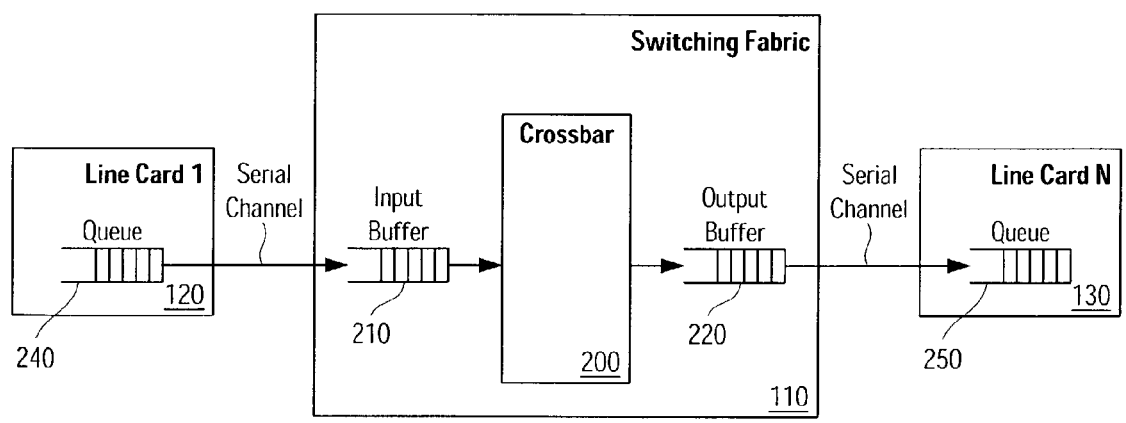
FIG. 2 is a simplified block diagram of several features of a prior art crossbar-based switching scheme.
Figure 3:
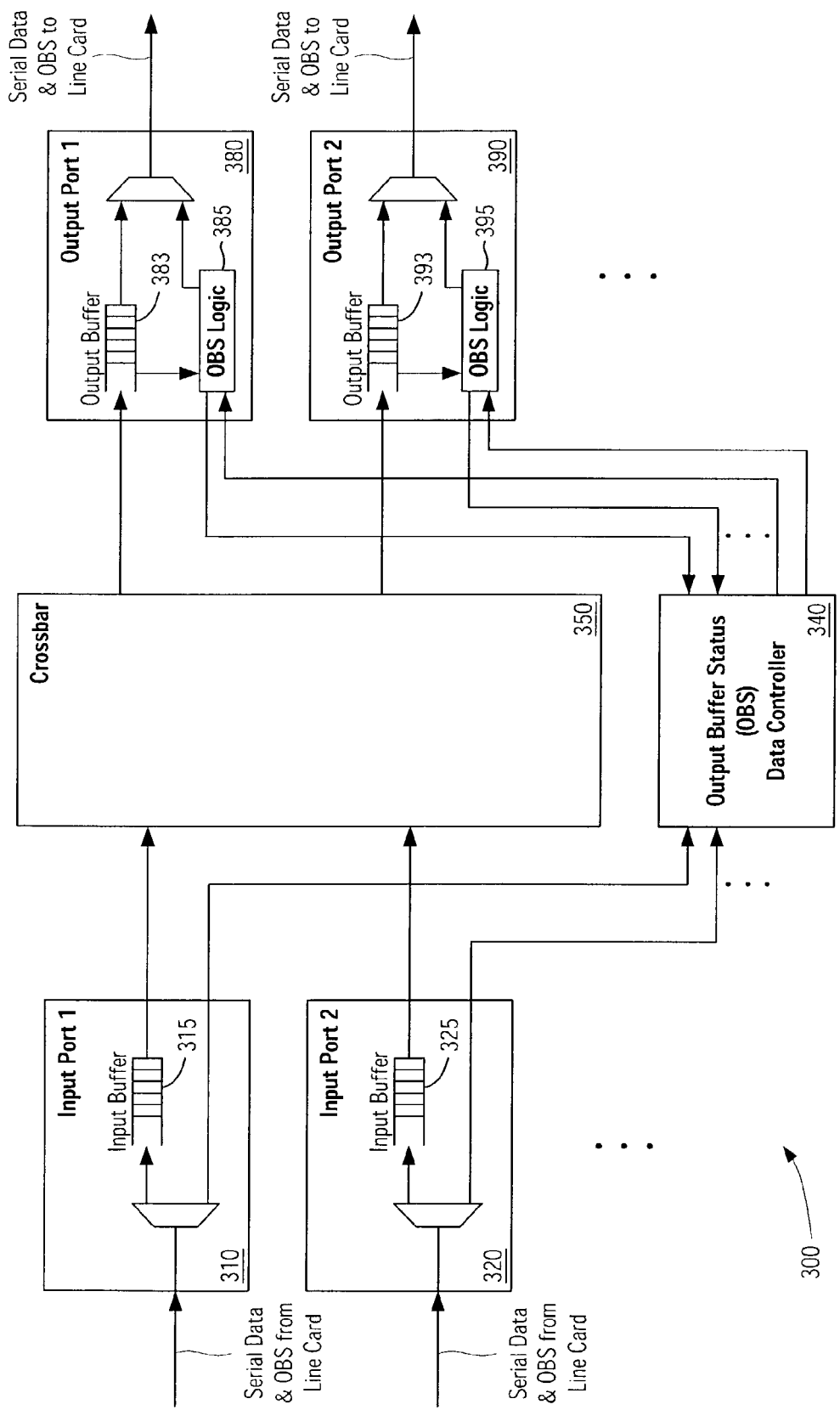
FIG. 3 is a simplified block diagram of a fabric switch.

FIG. 3 illustrates a simplified block diagram of a fabric switch. Data frames from various line cards are forwarded to fabric switch 300 and received at input ports 310 and 320. In general, there is at least one input port for each line card supported by fabric switch 300. Data arrives at the input ports as a serialized data stream. If the data stream includes line card output buffer status information, as will be discussed in greater detail below in connection with FIG. 6, that information is separated from the data stream and forwarded to output buffer status data controller 340. Data frames are stored in input buffers 315 and 325 prior to transmission across crossbar 350 to the appropriate output port, e.g., output ports 380 and/or 390. As is the case with input ports, there is typically at least one output port for each line card supported by fabric switch 300. In some implementations, there are multiple input ports and/or output ports per line card to support, for example, redundancy features.

Crossbar 350 can be implemented in a variety of ways as is well known to those of ordinary skill in the art. For example, crossbar 350 can include input port modules (not shown) that receive frames (or portions thereof) from a switch fabric input buffer. The crossbar can also include output port modules (not shown) having arbiter circuits that control access to the output port modules When an arbiter acknowledges a requested transfer, a corresponding input port module sends a frame into the crossbar. The output port module that acknowledged the transfer receives the frame and sends it on to an output buffer such as output buffer 383 or 393. Interconnection of input ports and output ports in crossbar 350 is typically achieved using one or more data buses, arbitration buses and multiplexers.

In one embodiment, fabric switch 300 takes input frames from any port and stores them fully within that port's input buffer. From there, fabric switch 300 arbitrates for the output ports(s) designated by embedded data fields within the received frames. For example, a port of exit (PoE) can be designated by one or more bits in the frame of data. The fabric switch transfers a frame to an output buffer, e.g., output buffers 383 and 393, corresponding to the port designated by the port of exit bits. Multiple port of exit bits can be asserted to send a frame to multiple destinations. After the arbitration is finished the data will flow from the input buffer memory to the output buffer memory. After frames are fully received within the output buffer, the frame can then be moved across the output port to the destination line card and on to a destination network device.

Output ports 380 and 390 also include output buffer status (OBS) logic 385 and 395 respectively to monitor the status of the output buffers, particularly the degree to which the output buffers are full, to provide output buffer status information to line cards associated with the various output ports, to receive output buffer status information from other output buffers via OBS data controller 340, and/or to provide output buffer status information to OBS data controller 340. Each output port combines the normal data stream with output buffer status information, which can include, for example, a control word having several bits identifying the control word as an OBS control word and additional bits describing buffer fullness and/or capacity information. The combined data stream is serialized and transmitted to the appropriate line card.

In one embodiment, the output buffer status information is distributed from the output ports to various line cards in an in-band fashion. More particularly, output buffer status information is inserted into the normal data stream so that additional out-of-band data paths are not needed. Adding out-of-band data paths to the switching fabric and line card architectures increases complexity and cost of the devices, and makes using the newer switching fabrics and/or line cards with older equipment, e.g., a previous generation of backplane hardware, more problematic.

Additionally, since it is generally the case that a given line card in a network switch needs to be able to communicate with every other line card in the network switch, it is desirable that each line card have output buffer status information for all output buffers in the switching fabric. Thus, in the example illustrated in FIG. 3, it is desirable that a line card coupled to output port 1 380 have output buffer status information for output buffer 383 of output port 1 380, output buffer 393 of output port 2 390, and any other output buffer of switching fabric 300. To accomplish this in an efficient manner, output buffer status information for each of the output buffers of switching fabric 300 is gathered by OBS data controller 340. OBS data controller 340 also distributes this information to OBS logic associated with each of the output ports. Consequently, each output port has output buffer information for all of the output buffers associated with the output ports of the switching fabric. So, for example, OBS logic 385 can cause output buffer status information for all output buffers associated with the output ports of switching fabric 340 to be sent to the line card coupled to output port 1 380. By centrally collecting and packing output buffer status information, switching fabric 300 can simultaneously update all line cards in a small number of data transfers.

Figure 4:
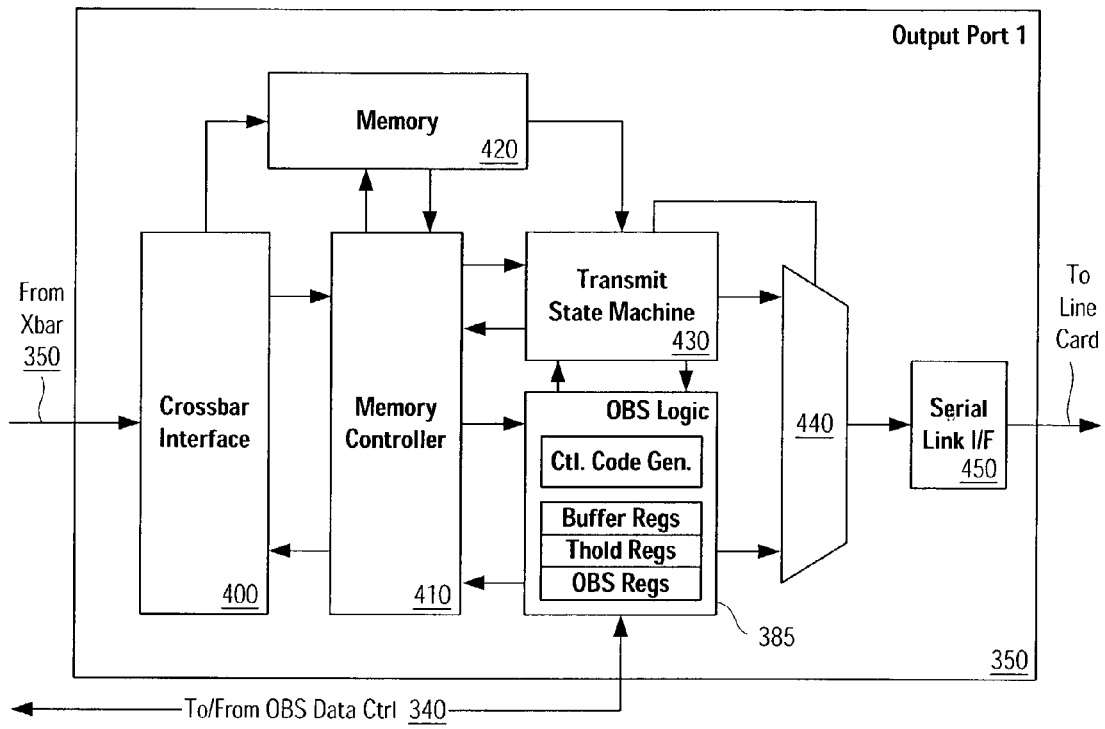
FIG. 4 is a simplified block diagram of an output port of the fabric switch of FIG. 3.

FIG. 4 illustrates a simplified block diagram of one implementation of output port 1 380 of fabric switch 300. Data destined for output port 1 380 is received from crossbar 350 by crossbar interface 400. Arriving data is accumulated to one or more memory words at which time a write circuit writes the data to memory 420 in conjunction with memory controller 410. Thus, output buffer 383 can be logically implemented within memory 420. In one embodiment, the output buffer will drop all data sent to it if the data cannot be stored within memory 420. Data will only start being stored within memory 420 when the beginning of a frame has arrived and there is room in memory 420 for the transfer. If memory 420 runs out of room while receiving a frame, the transfer is typically terminated and appropriate control bits set. Such an abnormally terminated frame will be sent to the line card, which will perform requisite verification, e.g., a CRC verification. In this example, the line card will determine that there is an error in the frame and the frame will be dropped.

Transmission of a data frame from output port 1 380 is controlled by transmit state machine 430. Transmit state machine 430 removes frames from memory 420 in conjunction with memory controller 410, inserts needed control information, and forwards the data stream to serial link interface 450 via multiplexer 440. Since output buffer 380 transmits data to a line card, the data is serialized using serial link interface 450. Transmit state machine 430 also coordinates with OBS logic 385 the insertion of output buffer status information into the data stream. As illustrated, OBS logic 385 typically includes output buffer status control code generation circuitry, along with output buffer registers (e.g., describing the organization of the output buffer within memory 420), output buffer status threshold registers, and OBS registers that store output buffer status information from other output buffers. In some embodiments, OBS logic 385 is included as part of transmit state machine 430 since transmit state machine 430 also inserts control codes/words into the data stream and manipulates data in memory 420 based on output buffer definitions. In still other embodiments, some of the registers in OBS logic 385, e.g., OBS registers that store output buffer status information from other output buffers are not local to OBS logic 385 but are instead part of some register space common to switching fabric 300.

Figure 5:
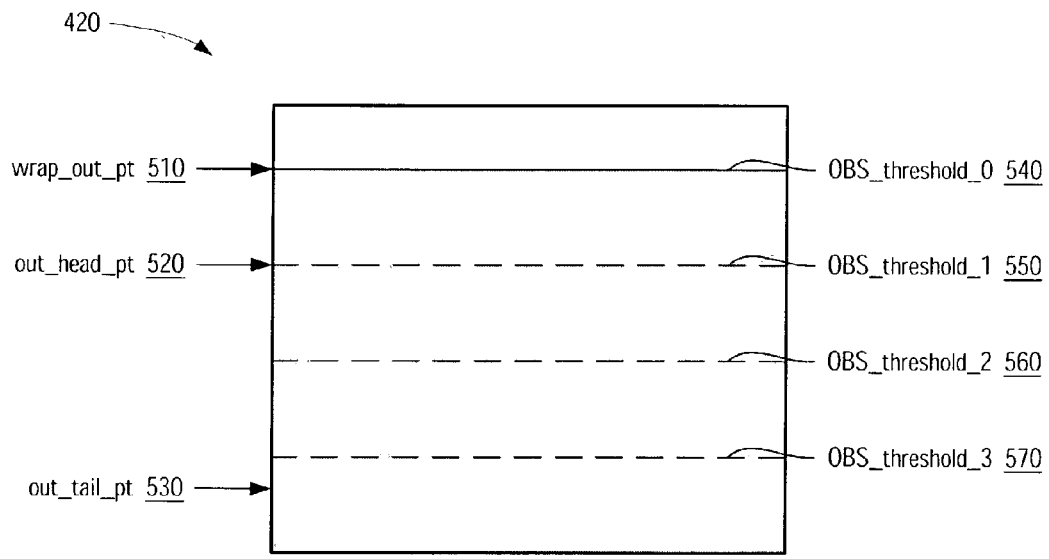
FIG. 5 illustrates an example of memory organization in support of the techniques of the present invention.

FIG. 5 illustrates an example of the organization of memory 420 to create output buffer 383. Memory 420 is logically divided into one or more buffers as needed. In this example, a single buffer for queuing data is illustrated. Two pointers describe boundaries of data currently stored in the buffer. The pointer out_tail_pt 530 describes the location of the next data frame (or portion thereof) to be removed from the queue and the pointer out_head_pt 520 describes the location where data is added to the queue. The pointer wrap_out_pt 510 is used to set the wrap point for the output buffer queue. The wrap point represents the address where the output buffer queue ends. When the address pointer of the output buffer queue reaches the wrap pointer, the next location will be the first location of queue. Thus, pointers 510, 520, and 530 generally describe the organization of the output buffer and there values can be stored in the buffer registers illustrated. Those having ordinary skill in the art will readily recognize that a variety of different buffering and memory organizing techniques can be used to implement the high and low priority queues.

FIG. 5 also illustrates OBS threshold values 540, 550, 560, and 570. The OBS threshold values indicate threshold percentages of the output buffer memory filled by data. OBS logic 385 uses the threshold values to determine what output buffer status information to distribute. In one embodiment, the OBS threshold values (representing percentage of buffer filled) 540, 550, 560, and 570 are compared against a count of buffer space consumed, and that value is typically determined using one or more of the pointers out_tail_pt 530, out_head_pt 520, and wrap_out_pt 510. For example, four different levels can be described with the thresholds illustrated. OBS_threshold_0 540 represents a full output buffer, OBS_threshold_1 550 represents a buffer that is at or has exceeded 75% capacity, OBS_threshold_2 560 represents a buffer that is at or has exceeded 50% capacity, and OBS_threshold_3 570 represents a buffer that is at or has exceeded 25% capacity. In each case, corresponding output buffer status information can be distributed based on the comparison conducted by OBS logic 385. Other threshold schemes can also be implemented. For example, a first threshold might indicate the output buffer is filled to between 0% and 25% of capacity, a second threshold might indicate the output buffer is filled to between 25% and 50% of capacity, and so on. Alternately, a larger or smaller number of thresholds can be used. FIG. 5 illustrates one example of a way in which memory 420 can be organized to implement the desired output buffer. A variety of different structures can be implemented in support of the output buffers of switching fabric 300.

In one embodiment, the threshold registers of OBS logic 385 store both information describing the threshold values or levels themselves, e.g., for the purpose of the determining whether a particular threshold has been met, and corresponding status values indicative of the output buffer status to be distributed. The output buffer status values are typically transmitted along with an appropriate control code indicating that the accompanying information is for output buffer status. In general, both the output buffer status threshold values and the status values stored in the registers are programmable.

Returning to FIG. 4, OBS logic 385 forwards one or more output buffer status values corresponding to the status of output buffer 383 to OBS data controller 340. OBS logic 385 also receives from OBS data controller 340 output buffer status values corresponding to other output buffers of the fabric switch. OBS logic 385 also prepares control words bearing output buffer status information for insertion into the data stream leaving output port 1 380.

In one embodiment, an OBS control word is inserted into the serial data stream. The control word can include information specifically identifying the port from which the control word and corresponding output buffer status information are sent. Alternately, a control code merely indicates that OBS information follows the code, the following information including both port of origination and status information. As previously mentioned, it is advantageous for a given output port to transmit output buffer status information for all output buffers on all output ports of the switching fabric to the line card corresponding to the given output port. In this manner, the line card can receive information that it can use to shape the traffic to various switching fabric output ports by, for example, choosing to send pending data for a first output port that is less congested instead of sending data to another output port that is more congested than the first. Moreover, by sending output buffer information within the normal data stream, the aforementioned advantages of in-band communication are achieved.

In general, the OBS control codes/words and their accompanying information can be inserted anywhere in the data stream. For example, the they can be inserted before or after a complete data frame. Alternately, the OBS control codes/words and accompanying information can be inserted at any part of the data stream so that it might interrupt a data frame. Additionally, the OBS control codes/words may include information about other control functions. For example, an OBS control word might also include frame delimiter information, e.g., end of frame, next frame is high priority, next frame is low priority, etc., so that bandwidth can be conserved. Thus, a single OBS control word can serve one or more additional control functions, perhaps unrelated to output buffer status. Although output buffer status information has been described as including information about the degree to which an output buffer is full, output buffer status information can include a variety of other types of information related to the output buffer. For example, transmitted status information might include the capacity of the corresponding output buffer. In such an implementation, a line card receiving switching fabric output buffer capacity information could adjust the size of its own buffers to help alleviate congestion.

Returning to FIG. 3, in some implementations multiple fabric switches 300 are used so that a larger number of line cards and/or greater bandwidth can be supported. In such bit-sliced implementations, each of the fabric switches is synchronized so that data transfer across respective crossbars occurs approximately simultaneously. Synchronization and de-skew circuitry can be provided as separate circuits, e.g., not part of a fabric switch ASIC, between the line cards and the fabric switch, or such circuits can be provided as part of the fabric switch circuit itself. Additionally, one of the multiple fabric switches can be designated as a master while the others are slaves. In such an example, fabric switch header information, e.g., port of exit information, is always received by the master fabric switch. The master fabric switch makes some or all decisions and communicates those decisions to the slave fabric switches via a synchronization bus. Complete OBS control codes/words and corresponding output buffer status information can be sent to the master alone, which might then distribute the information, or it can be distributed to each slice of the fabric.

Each of the input and output ports illustrated in switching fabric 300 include only one input or output buffer. In alternate embodiments, multiple buffers can be used for each input and/or output port to, for example, implement differing priority levels of buffers. Such differing priority levels are useful for implementing quality of service (QoS) and class of service (CoS) features. An example of a multiple priority level fabric switching scheme is described in U.S. patent application Ser. No. 10/288,937, entitled "Prioritization and Preemption of Data Frames Over a Switching Fabric," filed Nov. 6, 2002, and naming Mick R. Jacobs and Michael A. Benning as inventors (the "'937 application"). The '937 application is hereby incorporated by reference herein in its entirety. The '937 application describes two priority levels, high and low, but those having ordinary skill in the art will readily recognize that the devices and techniques of the '937 application can be extended to more than two priority levels. Additionally, the output buffer status techniques of the present application can be extended to switching fabrics that employ prioritization schemes such as those described in the '937 application.

Figure 6:
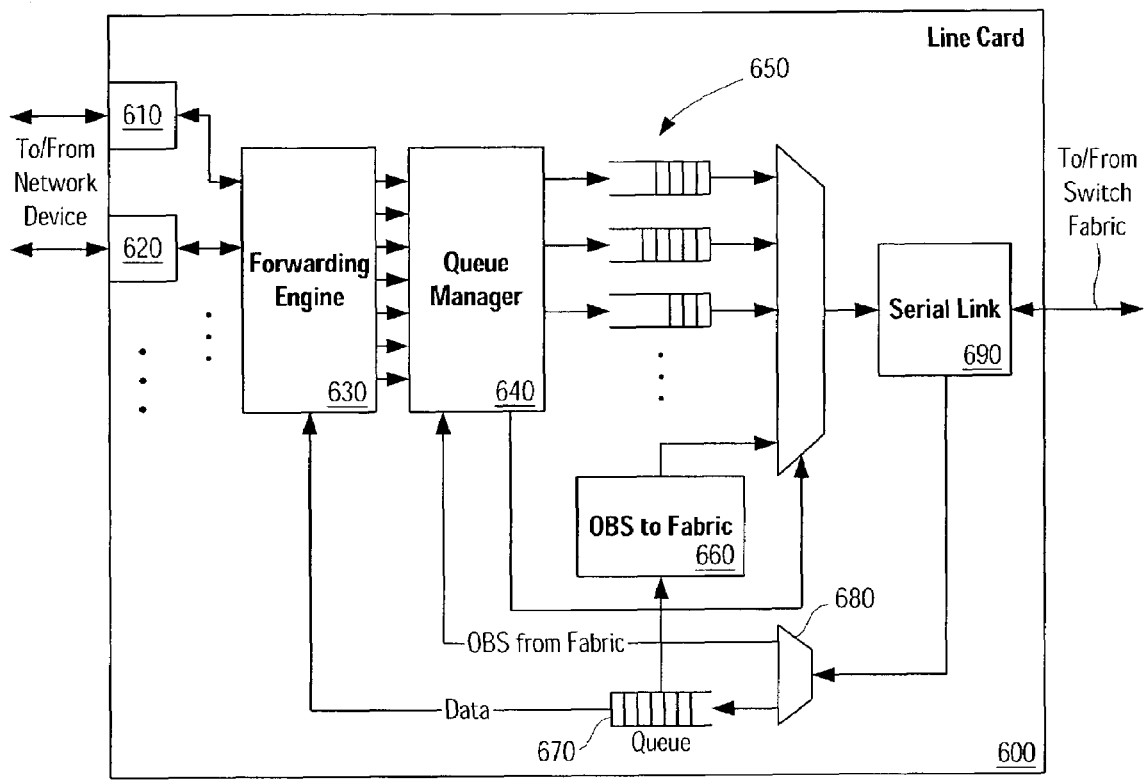
FIG. 6 is a simplified block diagram of a line card.

FIG. 6 illustrates a simplified block diagram of a line card that makes use of the output buffer status information provided by switching fabric 300. Data frames arrive at line card 600 from various network devices via I/O ports such as ports 610 and 620. Data frames also arrive from a switching fabric such as switching fabric 300. An inbound serial stream from the switching fabric is received at serial link 690, deserialized, and transferred to separation logic 680. Separation logic 680 detects OBS codes transmitted from the switching fabric and forwards the in-bound output buffer status information to queue manager 640. The remaining data stream is stored in queue 670 and ultimately transferred to forwarding engine 630. Once in-bound data frames are received by forwarding engine 630, the forwarding engine transfers each data frame to an appropriate I/O port and on to a corresponding network device. In some embodiments, separation logic 680 removes the OBS codes and corresponding information from the data stream.

Queue manager 640 establishes and manages one or more virtual output queues 650 using output buffer status information from the switching fabric. Outbound data frames, i.e., those data frames received by forwarding engine 630 from an I/O port and destined for the switching fabric, are transferred to queue manager 640 where they are enqueued in an appropriate virtual output queue 650. The virtual output queues are used to avoid excessive congestion in the switching fabric. In one example, queue manager 640 establishes virtual output queues corresponding to each switching fabric output buffer. Dequeuing logic in queue manager 640 uses the output buffer status information to decide from which queue a data frame is sent. For example, if the output buffer status information indicates that output port 1 of the switching fabric is filled to capacity, queue manager 640 can decide to transmit frames to another, less congested fabric switch output port and thus dequeue frames from the appropriate virtual output queue.

In some embodiments, queue manager 640 can use a dequeuing algorithm that takes into account one or more of a variety of conditions including, for example, output buffer status information, quality of service requirements, and bandwidth fairness requirements. Examples of such algorithms include the random early detection algorithm (RED; sometimes also referred to as "Random Early Drop" or "Random Early Discard") or the weighted RED algorithm (WRED) or one of their variants, all well-known in the art and generally referred to below as "RED algorithms". The original RED algorithm is described in S. Floyd and V. Jacobson, "Random Early Detection Gateways for Congestion Avoidance," IEEE/ACM Transactions on Networking, Vol. 1, No. 4 (August 1993) (hereinafter Floyd & Jacobson), which is incorporated herein in its entirety by reference. Other RED algorithms are described in V. Jacobson, K. Nichols, and K. Poduri, "RED in a different light," Technical report, September 1999, which is incorporated herein in its entirety by reference. (See citeseer.nj.nec.com/jacobson99red.html)

For example, the principle behind RED is that packets are deliberately dropped before congestion occurs in order to prevent it happening in the first place. For each packet that is to be put onto a queue, there is a probability computed for just dropping the packet instead. RED algorithms require that this drop probability should increase as the average queue size increases. Although a linear probability curve shape was once thought to be sufficient, more recent work has shown that a shape closer to an exponential can provide better performance. Thus, exponential probability curves can be used with positive effect in RED algorithms. Furthermore, the configuration of the maximum probability of the probability curve may not be necessary. RED will behave well with the simple assumption that the maximum probability is one. In another example, a programmable probability curve is utilized, allowing, for example, a linear or exponential curve to be configured. The probability at the minimum threshold is zero, the probability at the maximum threshold is one, and there is any configurable curve between.

In an example where the WRED algorithm is used for dequeuing frames from the virtual output queues, the dropping can be weighted based on, for example, the space occupied in the corresponding virtual output queue, available queue memory, and the output buffer status information.

Line-card 600 can also include circuitry for gathering line-card buffer status information, distributing the information to various other line cards and switching fabric output buffers, and using the information for congestion control. For example, such buffer status information can be extracted from queue 670, processed by OBS to Fabric logic 660 in much the same was as the aforementioned OBS logic, and forwarded to other switch components. Once combined into to out-bound data stream of line card 600, the additional line-card output buffer status information can be received by logic in the input ports of switching fabric 300 (see FIG. 3). That output buffer status information is extracted from the data stream and forwarded to OBS data controller 340 where it is distributed to all of the output ports so that every line card in the switch will ultimately receive the additional output buffer status information.

In one embodiment, a queue manager from a line card uses line card output buffer status information, in much the same way as it uses switching fabric output port output buffer status information, from other line cards to select a virtual output queue from which to dequeue a data frame. For example, while the output buffer of a given switching fabric output port might not be particularly congested, e.g., filled to 25% of its capacity, the corresponding line card queue into which the switching fabric output port transmits frames might be near 100% capacity. Armed with such information, the queue manager of another line card with data to be sent to the switching fabric output port, and thus the congested corresponding line card queue, can choose to send data from another virtual output queue instead. Thus, even though congestion would not have been encountered at the switching fabric output port, it would have been encountered at the corresponding line card. In this manner, some traffic congestion can be avoided.

It should also be noted that line cards such as line card 600 generally include a variety of additional components in support of various frame processing and switching functions not described or illustrated in the present application. A fabric switch as described above can be used in conjunction with line cards that do not support the described output buffer status information. In such circumstances, the fabric switch can be configured to fallback to a more simplified mode of operation. For example, if fabric switch 300 is transmitting to a line card that does not use output buffer status information, the fabric switch can be configured to still gather and distribute such information since some line cards in the switch might use the information.

The line cards and switching fabric described in this application can be used in a variety of devices including network switches, switch-routers, routers, router-switches and storage network devices. The term "switch" is used in this specification to describe equipment used to direct information over a network based on address information. Those skilled in the art will understand that such equipment includes, for example, switches and routers. For example, a switch may direct an information packet based on address information contained within the packet. However, embodiments of the present invention are not limited to use in a switch, but may be used at any point in a network. Thus, the term "network" as used herein is to be broadly construed to mean any communication system in which carried information has a characteristic subject to monitoring. Also, although the primary focus of the current invention is Internet Protocol (IP) packet flows, those skilled in the will art realize that protocols and flows other than IP, such as Ethernet, can be benefit from the present invention and its alternate embodiments. Accordingly, the invention is not limited to any particular type of protocol or packet format.

Although the devices and techniques described above have focused on switching fabric implementations using crossbars, other types of switching fabrics, such as single-bus architectures and shared-memory architectures, can also be used.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. An apparatus comprising:
   a plurality of input ports;
   a switch coupled to the plurality of input ports; and
   a plurality of output ports coupled to the switch, at least one of the plurality of output ports being operable to receive data via the switch from at least one of the plurality of input ports, the at least one of the plurality of output ports including:
      an output buffer; and
      output buffer status logic operable to produce output buffer status information corresponding to the output buffer, and wherein the output buffer status logic is further operable to receive output buffer status information that corresponds to an output buffer of another of the plurality of output ports.

2. The apparatus of claim 1 wherein the output buffer status logic is further operable to transmit the produced and/or received output buffer status information to at least one line card.

3. The apparatus of claim 1 wherein the output buffer status logic is further operable to transmit the produced output buffer status information to the other output port.

4. The apparatus of claim 1 wherein the produced and/or received output buffer status information includes at least one value, the at least one value being indicative of a corresponding memory storage threshold in a memory of the output buffer.

5. The apparatus of claim 1 wherein the produced and/or received output buffer status information includes an output buffer status command and an output buffer status value.

6. The apparatus of claim 1 further comprising a plurality of registers, the plurality of registers operable to store at least one output buffer status threshold value.

7. The apparatus of claim 1 wherein the at least one of the plurality of output ports further comprises:
   at least one additional output buffer, each of the output buffers and the at least one additional output buffer storing data having a respective priority.

8. The apparatus of claim 1 wherein the switch includes at least one of a crossbar, a single data bus, and a shared-memory.

9. The apparatus of claim 1 further comprising:
   a plurality of line cards, each of the plurality of line cards being coupleable to at least one network device and to transmit/receive data to/from the at least one network device;
   wherein each of the plurality of line cards is coupled to a respective one of the plurality of output ports, and wherein each of the plurality of line cards is coupled to a respective one of the plurality of input ports.

10. The apparatus of claim 9 wherein at least one of the plurality of line cards includes a queue manager, the queue manager operable to receive the produced and/or received output buffer status information and to dequeue at least one data frame according to the produced and/or received output buffer status information.

11. The apparatus of claim 10 wherein the queue manager is further operable to establish a plurality of output queues and to select the at least one data frame according to a congestion avoidance algorithm.

12. The apparatus of claim 1 further comprising:
   an output buffer status data controller coupled to the at least one of the plurality of output ports and operable to receive the produced output buffer status information.

13. The apparatus of claim 12 wherein the output buffer status data controller is coupled to at least one other of the plurality of output ports and is further operable to transmit the produced output buffer status information received by the output buffer status data controller to the at least one other of the plurality of output ports.

14. The apparatus of claim 12 wherein at least one of the plurality of input ports further comprises output buffer status information separation logic, the output buffer status information separation logic operable to extract additional output buffer status information from data received by the at least one of the plurality of input ports and to transmit the additional output buffer status information to the output buffer status data controller.

15. The apparatus of claim 1 wherein at least one of the plurality of input ports further comprises output buffer status information separation logic, the output buffer status information separation logic operable to extract additional output buffer status information from data received by the at least one of the plurality of input ports and to transmit the additional output buffer status information to the at least one of the plurality of output ports.

16. A method comprising:
   receiving data at an output port of a switching fabric;
   storing the data in at least one output buffer;
   determining output buffer status information based on the data stored in the output buffer;
   transmitting the determined output buffer status information to another output port;
   receiving output buffer status information from the other output buffer; and
   transmitting the received output buffer status information to a line card.

17. The method of claim 16 wherein the act of transmitting the determined output buffer status information to the other output port further comprises:
   transmitting the determined output buffer status information to an output buffer status data controller; and
   transmitting the determined output buffer status information from the output buffer status data controller to the other output port.

18. The method of claim 16 wherein the determined output buffer status information includes at least one value, the at least one value being indicative of a corresponding memory storage threshold in a memory of the output buffer.

19. The method of claim 16 wherein the determined and/or received output buffer status information includes an output buffer status command and an output buffer status value.

20. The method of claim 16 further comprising:
   determining at least one output buffer status control code; and
   transmitting the at least one output buffer status control code along with the determined and/or received output buffer status information.

21. The method of claim 16 further comprising storing at least one output buffer status threshold value in a register.

22. The method of claim 21 wherein the act of determining output buffer status information further comprises:
   comparing the at least one output buffer status threshold value to at least one output buffer pointer.

23. The method of claim 16 wherein the at least one output buffer includes a first output buffer and a second output buffer, the method further comprising:
   storing data having a first priority in the first output buffer; and storing data having a second priority in the second output buffer.

24. The method of claim 16 further comprising:
receiving the determined and/or received output buffer status information at the line card; and
dequeuing at least one data frame in a queue of the line card according to the determined and/or received output buffer status information received at the line card.

25. The method of claim 24 wherein the dequeuing further comprises using a congestion avoidance algorithm.

26. The method of claim 16 further comprising:
receiving additional data at an input port coupled to the switching fabric:
extracting additional output buffer status information from the additional data; and
transmitting the additional output buffer status information to at least one of the output port and an output buffer status data controller.

27. The method of claim 16 wherein the switching fabric implements at least one of a crossbar, a single-bus architecture, and a shared-memory architecture.

28. An apparatus comprising:
at least one I/O port operable to connect to a network device;
a data frame forwarding engine coupled to the at least one I/O port;
a queue manager coupled to the data frame forwarding engine, the queue manager operable to establish and manage a plurality of virtual output queues;
a buffer coupled to the data frame forwarding engine and operable to receive data frames from a switching fabric; and
output buffer status logic coupled to the buffer wherein the outvut buffer status logic is operable to produce output buffer status information corresponding to contents of the output buffer, and wherein the output buffer status logic is operable to receive output status information corresponding to contents of another output buffer.

29. The apparatus of claim 28 wherein the output buffer status logic is further operable to transmit the output buffer status information it produces to the switching fabric.

30. The apparatus of claim 28 wherein the output buffer status information produced by the output buffer status logic; includes at least one value, the at least one value being indicative of a corresponding memory storage threshold in a memory of the output buffer.

31. The apparatus of claim 28 wherein the output buffer status information produced by the output buffer status logic, includes an output buffer status command and an output buffer status value.

32. The apparatus of claim 28 further comprising a plurality of registers, the plurality of registers operable to store at least one output buffer status threshold value.

33. The apparatus of claim 28 wherein the queue manager is further operable to receive the output buffer status information produced by the output buffer status logic, and to dequeue at least one data frame in at least one of the plurality of virtual output queues according to the output buffer status information produced by the output buffer status logic.

34. The apparatus of claim 28 wherein the queue manager is further operable to receive additional output buffer status information from the switching fabric.

35. An apparatus comprising:
a plurality of means for receiving data from at least one line card;
a switching means for transferring data from the plurality of means for receiving data from at least one line card, the switching means being coupled to the plurality of means for receiving data from at least one line card;
a plurality of means for receiving and storing data from the switching means, the plurality of means for receiving and storing data from the switching means being coupled to the switching means; and
at least one means for determining status information corresponding to contents of at least one of the plurality of means for receiving and storing data from the switching means, the at least one means for determining status information being coupled to the at least one of the plurality of means for receiving and storing data from the switching means;
a means for receiving status information corresponding to contents of another of the plurality of means for receiving and storing data from the switching means.

36. The apparatus of claim 35 wherein the at least one means for determining status information is further operable to transmit the determined and/or received status information to at least one other line card.

37. The apparatus of claim 35 wherein a first one of the plurality of means for receiving and storing data from the switching means stores data having a first priority and wherein a second one of the plurality of means for receiving and storing data from the switching means stores data having a second priority.

38. The apparatus of claim 35 wherein the plurality of means for receiving and storing data from the switching means includes a first and a second means for receiving and storing data from the switching means, and wherein the at least one means for determining status information includes a first and a second means for determining status information, the first means for determining status information being coupled to the first means for receiving and storing data from the switching means and the second means for determining status information being coupled to the second means for receiving and storing data from the switching means, the apparatus further comprising:
a means for controlling status information.

39. The apparatus of claim 38 wherein the means for controlling status information is further operable to transmit status information corresponding to contents of at least one of the plurality of means for receiving and storing data from the switching means to at least one of the first and second means for receiving and storing data from the switching means.

40. The apparatus of claim 35 further comprising:
a means for separating status information from a data stream, the means for separating status information from a data stream being coupled to at least one of the plurality of means for receiving data from at least one line card.

* * * * *